United States Patent Office 3,425,752
Patented Feb. 4, 1969

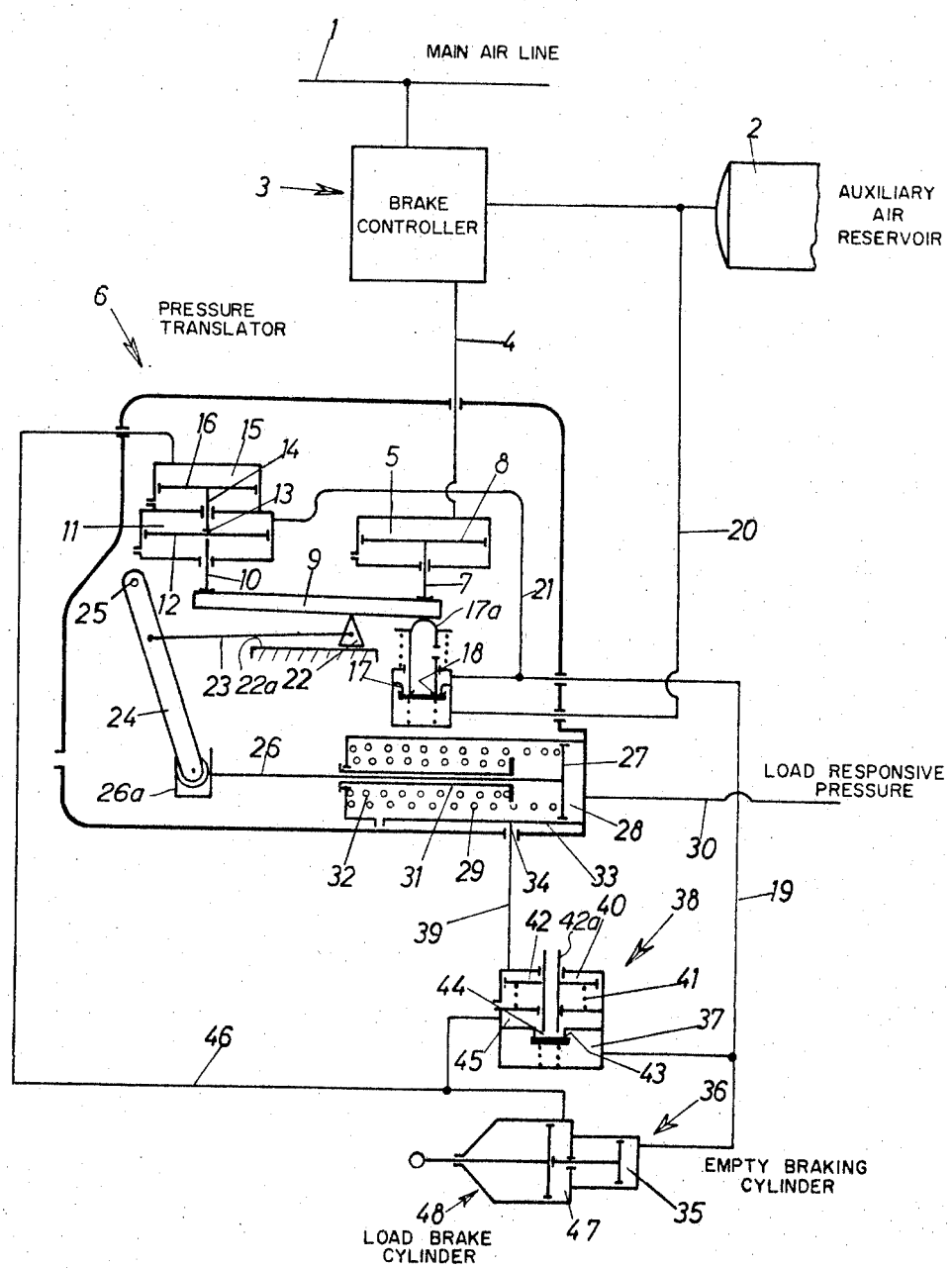

3,425,752
AIR BRAKING SYSTEM FOR RAILWAY VEHICLES
Hans Pöllinger and Bernd Wosegien, Munich, Germany, assignors to Knorr-Bremse G.m.b.H., a limited-liability corporation of Germany
Filed Sept. 18, 1967, Ser. No. 668,572
Claims priority, application Germany, Sept. 16, 1966, K 60,266
U.S. Cl. 303—23    9 Claims
Int. Cl. B60t 8/22

ABSTRACT OF THE DISCLOSURE

An air braking system for railway vehicles having an air brake controller and a translator for modifying the braking effect of the pressure regulated by the brake controller in response to the load on the vehicle to deliver a controlled pressure to empty and load braking cylinders. The translator is provided with a return piston for regulating the controlled pressure and an auxiliary piston for regulating the controlled pressure in response to the pressure in the load braking cylinder. There is, further, a switching device for connecting the load braking cylinder to the translator controlled pressure when the load on the vehicle exceeds a predetermined amount.

---

The present invention relates to a compressed air braking system for railway vehicles, more particularly, to such a braking system having a load responsive pressure regulator which is subjected to only a uniform displacement throughout the entire braking range from an empty vehicle to a loaded vehicle.

Many forms of compressed air braking systems which are load responsive have been devised for railway vehicles. Such systems generally comprise a translator which modifies the braking effect as regulated by the brake controller in order to deliver a controlled pressure to the braking cylinders which pressure is responsive to the load on the vehicle. In this manner, a movement of the brake controller while the vehicle is empty will produce one braking effect while the same movement of the controller while the vehicle is loaded will produce a proportionately greater braking effect.

In one known form of the above braking system which is suitable for vehicles having a high ratio of full load to empty load a pressure translator is provided which traverses the entire conversion ratio range beginning with the empty vehicle and throughout progressive loading of the vehicle. The load braking cylinder is kept empty by means of a switching device. The maximum translation ratio is attained when the vehicle is about half loaded. At this time, a maximum braking pressure will be delivered into the empty braking cylinder. Upon further loading of the vehicle, the switching device is actuated which returns the pressure translator to the range of its minimum translation ratio and connects the load braking cylinder with the empty braking cylinder. The translator again traverses its entire ratio range until the maximum load is placed upon the vehicle.

The conventional pressure translators as employed in the above-described braking system are generally provided with a balance beam having a movable fulcrum. The translators have a relatively small delivered pressure and during the several stages of a relatively weak application accordingly effect only an imperfect application of braking. In addition, they also have a relatively poor performance during frequent intermediate load conditions. It is further pointed out that the switching device of the above form of braking system requires complicated mechanical translating devices that necessitate continual attention in order to operate properly.

In another known air braking system the brake controller regulates two load-responsive adjustable pressure translators. The first translator directs a braking pressure into an empty braking cylinder from an empty vehicle condition and which increases as the load increases. When the vehicle is about half loaded the maximum braking pressure will be applied. Upon further loading of the vehicle, the empty braking cylinder will retain its maximum braking pressure while the second pressure translator begins to direct a braking pressure into a load braking cylinder which previously has been evacuated. This braking pressure, similarly, will increase with the loading of the vehicle.

This braking system performs satisfactorily in that it exhibits good step-wise or progressive operation but has the disadvantage of requiring two pressure translators which significantly increase the cost of manufacture and installation.

It is therefore the principal object of the present invention to provide a novel and improved fluid pressure braking system for railway vehicles.

It is another object of the present invention to provide a compressed air braking system for railway vehicles which is load responsive.

It is a further object of the present invention to provide a simple yet effective pressure translator for a railway air braking system.

The disadvantages of the prior art are eliminated and the above objects are attained by the railway air braking system according to the present invention. In one form of the present air braking system there may be provided a brake controller valve which is connected to a source of compressed air and a translator for modifying the braking effect of pressure regulated by the controller in response to the load of the vehicle to deliver a controlled pressure. There is an empty braking cylinder which is continuously connected to the controlled pressure line of the translator. A load braking cylinder is provided which is open to the atmosphere when less than a predetermined load is carried by the vehicle and is connectable to the controlled pressure line above this predetermined load. In the translator there is provided a return piston which is responsive to the controlled pressure of the translator for regulating the controlled pressure. An auxiliary piston is provided which is operatively connected to the return piston and operates in the same direction in response to the pressure in the load braking cylinder in order to regulate the controlled pressure. The translator is also provided with a switching device which is responsive to the load on the vehicle and operates above a predetermined load to shut off the load braking cylinder from the atmosphere and to connect the load cylinder to the controlled pressure of the translator.

As a result of the air braking system as disclosed herein it will be apparent that only a single pressure translator of approximately the conventional construction is required. This translator will be subjected to a uniform displacement throughout the entire braking range from the empty vehicle to the loaded vehicle. Accordingly, a simple but highly dependable braking system is provided.

Other objects and advantages of the present invention will be apparent upon reference to the accompanying description when taken in conjunction with the drawing which shows schematically in the form of a circuit diagram the air braking system of the present invention.

In one specific embodiment of the present invention as illustrated in the drawing, there is provided a main compressed air line 1 communicating with an auxiliary air reservoir 2 and a brake controller valve 3 which is operated by the operator of the vehicle to obtain the braking effect. The controller 3 acts through a line 4 which delivers air pressure to a cylinder 5 located in a pressure translator indicated generally at 6. The pressure delivered to the cylinder 5 corresponds to the intended braking force as determined by the controller 3 but is independent of the load on the vehicle.

Cylinder 5 comprises a piston rod 7 attached to a piston 8 with the end of a piston rod engaging one end of a pivotally mounted beam 9. The other end of the beam 9 is engaged by a piston rod 10 attached to a return piston 12 located in a return cylinder 11. An auxiliary piston and cylinder arrangement is mounted with respect to the return piston and cylinder arrangement so as to act in the same direction and comprises a piston rod 14 having a pressure head 13 which engages return piston 12 to provide a mechanical abutment coupling. The piston rod 14 is connected to a piston 16 which is reciprocable in a fluid tight slide bearing in the top of cylinder 11 with the piston 16 being responsive to fluid pressure in the cylinder 15.

The tiltable beam 9 actuates a double valve 17, 18 so as to connect a line 19 with a line 20 which leads to the auxiliary air reservoir 2. When the valve 17, 18 is closed, as shown in the drawing, the line 19 will not be in communication with the line 20. However, as soon as a force is exerted by piston 8 through piston rod 7 upon the beam 9, a valve actuator 17a will be depressed to open valve 17 and provide communication between lines 19 and 20. When the force exerted by piston rod 7 is insufficient to tilt the beam 9 to depressed actuator 17a the pipe 19 will be in communication with the atmosphere through valve 18 and the hollow actuator 17a.

The pipe 19 is connected within the translator 6 to the return cylinder 11 through a line 21.

The beam 9 rests upon a movable fulcrum which is slidable along a surface 22a within translator 6. The fulcrum 22 is connected by a rod 23 to a lever 24 which is pivotally mounted on a bolt 25 fixed in the housing of translator 6. The other end of lever 24 is pivotally connected to a piston rod 26 at 26a. The piston rod 26 is attached to a piston 27 which is reciprocable within cylinder 33 and acts against a spring 29. The interior 28 of the cylinder 33 is connected through a line 30 which contains a fluid under pressure in response to the load on the vehicle.

Cylinder 33 contains a second spring 32 which is concentric with first spring 29 and is confined by an anchor arrangement 31 to about one-half of the maximum range of displacement of reciprocable piston 27. At approximately the upper end of spring 32, the cylinder 33 is provided with a connection 34 which is traversed by the piston 27 and to which is joined a pipe 39.

The pipe 19 is connected to the interior 35 of an empty braking cylinder indicated generally at 36 and to a space 37 in a switching valve indicated generally as 38. The switching valve 38 has a piston 42 mounted on a hollow piston rod 42a and is urged upwardly in cylinder space 40 by a spring 41. The pipe 39 extending from cylinder 33 connects to the cylinder space 40. The hollow piston rod 42a controls a double valve 43, 44. In the unactuated position of valves 43, 44 as shown in the drawing the chamber 45 within switching valve 38 is open to the atmosphere through hollow piston rod 42a. The chamber 45 is connected through a pipe 46 to the cylinder space 47 in a load braking cylinder 48. The pipe 46 is also connected to cylinder space 15 of auxiliary cylinder located in translator 6. The load braking cylinder 48 may be structurally integral with the empty braking cylinder 36 as schematically illustrated in the drawing.

When the piston 42 is actuated by the entry of compressed air through pipe 39, valve 44 will be closed and valve 43 opened to provide communication between line 19 and line 46 through the chamber 37 and chamber 45.

*Operation of the braking system*

When the vehicle is empty and is carrying no load, the reciprocable piston 27 and the movable fulcrum 22 will be moved to the right hand limits of their respective ranges of displacement as illustrated in the drawing. In this position pipe connection 34 in cylinder 33 is not traversed by piston 27 and accordingly cylinder space 40 in switching valve 38 will be connected to the atmosphere through pipe 39. Double valve 43, 44 will be in the closed position as shown in the drawing so that the line 46 will be open to the atmosphere and accordingly the load braking cylinder 48 and auxiliary cylinder space 15 will also be open to the atmosphere.

To effect a braking of the vehicle, compressed air is introduced into the line 4 through the controller 3. The compressed air entering the cylinder 5 will depress piston 8 and, accordingly, pivot beam 9 clock-wise about fulcrum 22. This will immediately shut off line 19, and accordingly empty braking cylinder 36, from the atmosphere and will connect line 19 to the auxiliary air reservoir 2 through line 20 by means of the now open valve 17. Compressed air will then be introduced into the pipe 19 until the pressure in return cylinder space 11 is increased sufficiently through line 21 to depress return piston 12 and to pivot the longer lever arm of the beam 9 counter clock-wise. This counter clock-wise pivoting will continue until the beam is returned to a position of equilibrium as shown in the drawing so as to close valve 17 and to shut off the introduction of compressed air into pipe 19 through line 20. Until the air pressure in pipe 19 has been shut off, the compressed air will be directed through this pipe to the empty braking cylinder 36 to a corresponding braking effect.

When the brakes are released the same functions as described above will occur but in the reverse order.

When the vehicle is being loaded, the fluid pressure in pipe 30, and accordingly, in cylinder space 28 will correspondingly increase. This increase in fluid pressure will move piston 27 toward the left against the force of spring 29 in response to this increase of fluid pressure. As a result, the lever 24 will be pivoted clock-wise through the action of piston rod 26 whereby rod 23 and fulcrum 22 will be moved toward the left. The movement of the fulcrum 22 to the left will change the lever arm ratio of beam 9 so that in order to attain an equilibrium of forces acting on the beam 9 during application of the brakes, higher air pressures must be established in the pipe 19 than was the case when the vehicle was empty. The practical effect is that when the operator exerts the same force on the controller, greater braking forces will be exerted when the vehicle is loaded than when the vehicle is empty. The actual braking forces established in the braking cylinder will be in proportion to the load on the vehicle.

The relationship between the components of the translator 6 is such that shortly before an average load is placed on the vehicle, the piston 27 will have been moved to a position directly over pipe connection 34. At this point, i.e. an average load of the vehicle, the pressure translator 6 will direct a maximum braking pressure into line 19 and into empty braking cylinder 36.

When loading of the vehicle is continued so that the load is about average, the piston 27 will continue its movement to the left to transverse pipe connection 24 and to engage the inner spring 32. In this position of piston 27, cylinder space 28 will communicate with pipe 39 through connection 34 and compressed air in cylinder space 28 will pass into cylinder space 40 of switching valve 38. The piston 42 will be depressed against the force of spring 41 to reset double valve 43, 44 to shut off pipe 46 with the atmosphere and to connect pipe 46 with line 19 through chambers 45 and 37. Compressed air will then flow from pipe 19 into pipe 46 and into cylinder space 47 of the load braking cylinder 48 and also into auxiliary cylinder space 15 in the pressure translator 6.

The pressure increase in auxiliary cylinder space 15 will depress piston 16 so that piston head 13 acts upon piston 12 to depress piston 12 and to pivot the left hand end of beam 9 in a counter clock-wise direction. The compressed air will continue to escape from line 19 through line 46 to cylinder space 15 and through line 21 to cylinder space 11 until there is established an equilibrium of forces acting upon the beam 9. When equilibrium of the beam 9 is attained, the empty and load braking cylinders 36 and 48 will be under very low pressure.

The relative cross-sectional areas of the pistons in the empty and load braking cylinders 36 and 48 and the areas of auxiliary piston 16 and return piston 12 are so selected that immediately after the pipe connection 34 is traversed by piston 27, the two braking cylinders 36 and 48 will exert at the most only a slightly higher braking force than that which was exerted by the empty braking cylinder 36 alone under the high pressure then existing in line 19. It will be apparent that after the piston 27 has traversed connection 34 the pressure in line 19 will be lowered since air will escape through lines 21 and 46 as described above.

Upon additional loading of the vehicle, the piston 27 will be pushed further to the left against the combined force of the springs 29 and 32. This leftward movement will continue to modify the lever arm ratio of the beam 9 so that a correspondingly increasing pressure of air is directed into the braking cylinders 36 and 48 during the braking operation.

When the vehicle is loaded to its full capacity, the piston 27 and the movable fulcrum 22 will be at the left hand ends of their ranges of displacement and again line 19 will receive the maximum fluid pressure.

The operation of the braking system according to the present invention may be summarized as follows: When the vehicle is empty, the initial loading of the vehicle will result in only the empty braking cylinder 36 being supplied with compressed air with the pressure increasing until the vehicle has received about an average load. As the load is increased above average, both the empty and load braking cylinders will be supplied with compressed air that is first under low pressure but which pressure will be increased as the loading continues. When the maximum load of the vehicle is reached, the compressed air will be under maximum pressure. It is therefore apparent that the pressure translator 6 will traverse its entire translation range only once from a minimum to a maximum value, i.e. from an empty to a fully loaded vehicle. This insures a dependable step-wise progression of pressures for delivery to the braking cylinders 36 and 48 for all load conditions of the vehicle. The use of a single pressure translator thus considerably reduces the cost of the present braking system and assures its dependability and reliability under many and various operating conditions.

It will be understood that the present invention is susceptible to modification in order to adapt it to different usages and conditions.

What is claimed is:

1. In a fluid pressure braking system for vehicles, the combination of a brake control valve connected to a source of fluid under pressure, translator means connected to said controller for modifying the braking effect of pressure regulated by said controller in response to the load on the vehicle to deliver a controlled pressure, an empty braking cylinder connected to the controlled pressure line of said translator means, a load braking cylinder open to the atmosphere when less than a predetermined load is carried by the vehicle and connectable to said controlled pressure line, means responsive to the controlled pressure of said translator means for regulating the controlled pressure, auxiliary means operatively connected to said regulating means and responsive to the pressure in the load braking cylinder for regulating the controlled pressure, said translator means operable at above said pre-determined load to connect the controlled pressure thereof to said load braking cylinder.

2. In a fluid pressure braking system as claimed in claim 1 with said translator means including switching means responsive to the load on the vehicle and operable above said pre-determined load for shutting off said load cylinder from the atmosphere and connecting said load cylinder to the controlled pressure of said translator means.

3. In a fluid pressure braking system as claimed in claim 1 with said regulating means comprising a first cylinder and piston and said auxiliary means comprising a second cylinder and piston mounted for operation therewith, there being an abutment coupling between the second piston and said first piston.

4. In a fluid pressure braking system as claimed in claim 2 with said switching means comprising a cylinder and piston reciprocable therein by fluid pressure responsive to the load on said vehicle, spring means within said cylinder acting on said piston against the force of said fluid pressure, shut-off means connected to said cylinder and actuated when said piston is moved to a pre-determined position by said load fluid pressure, and means actuated by said shut-off means for connecting said load braking cylinder to the controlled pressure of said translator means.

5. In a fluid a pressure braking system as claimed in claim 4 with said load braking cylinder connecting means comprising a pneumatically actuated valve.

6. In a fluid pressure braking system as claimed in claim 4 with said shut-off means comprising a conduit connected to said cylinder and traversed by said reciprocable piston.

7. In a fluid pressure braking system as claimed in claim 4 with said spring means comprising first and second springs, said first spring continuously acting on said piston, said second spring acting upon said piston after said piston has actuated said shut-off means.

8. In a translator apparatus for modifying the braknig effect of the brake controller of a vehicle in response to the load on the vehicle to deliver a controlled pressure, the combination of switching means responsive to the load on the vehicle and operable above a pre-determined load to shut off a braking cylinder from the atmosphere and to connect the braking cylinder to the controlled pressure of the translator, a cylinder having therein a return piston responsive to the controlled pressure at all vehicle loads to regulate the controlled pressure, and a second cylinder having therein an auxiliary piston operable in the same direction as the return piston and responsive to the pressure in a braking cylinder above the pre-determined load to regulate the controlled pressure of the translator.

9. In a translator apparatus as claimed in claim 8 with said pistons being coaxial with respect to each other.

References Cited

UNITED STATES PATENTS 2,332,620 10/1943 White _____ 303—23

MILTON BUCHLER, *Primary Examiner.*

J. J. McLAUGHLIN, JR, *Assistant Examiner.*

U.S. Cl. X.R.

303—22